United States Patent [19]

Delatorre

[11] Patent Number: 5,207,767
[45] Date of Patent: May 4, 1993

[54] CAPACITOR AND PRESSURE TRANSDUCER

[75] Inventor: Leroy C. Delatorre, Sugar Land, Tex.

[73] Assignee: Panex Corporation, Sugar Land, Tex.

[21] Appl. No.: 770,352

[22] Filed: Oct. 3, 1991

[51] Int. Cl.⁵ .............................. G01L 7/04; G01L 9/12
[52] U.S. Cl. .......................................... 73/733; 73/718; 73/724; 73/862.473; 361/283
[58] Field of Search ................ 73/733, 742, 743, 718, 73/724, 862.48, 862.28, 155, 154, 151, 862.473; 361/283

[56] References Cited

U.S. PATENT DOCUMENTS

| | | | |
|---|---|---|---|
| 2,563,899 | 8/1951 | Wiancko | 73/742 |
| 4,873,870 | 10/1989 | Delatorre | 73/724 |

*Primary Examiner*—Donald O. Woodiel
*Attorney, Agent, or Firm*—Donald H. Fidler

[57] ABSTRACT

A dual capacitor device for utilizing dependent capacitances for measurement purposes where a first capacitor base member and a second capacitance base member are arranged with parallel capacitor surfaces in parallel planes and where the parallel capacitor surfaces are located on opposite sides relative to a central transverse plane to define first and second capacitors. The second capacitor base member has a centrally located section connected to an outer section of the second capacitor base member by a torsion beam and the centrally located section is attached to the first capacitor base member by a coupling member. Angular displacement of the outer section relative to the centrally located section about the displacement axis produces a capacitance change in the first and second capacitors. A torque force applied to the outer section by a spirally wound bourdon tube in response to pressure develops a low force on the torsion beam which is less than the micro yield point of the torsion beam material and develops a micro dimensional angular displacement of the outer section of the second capacitance base member and a capacitance change as a function of the force.

24 Claims, 4 Drawing Sheets

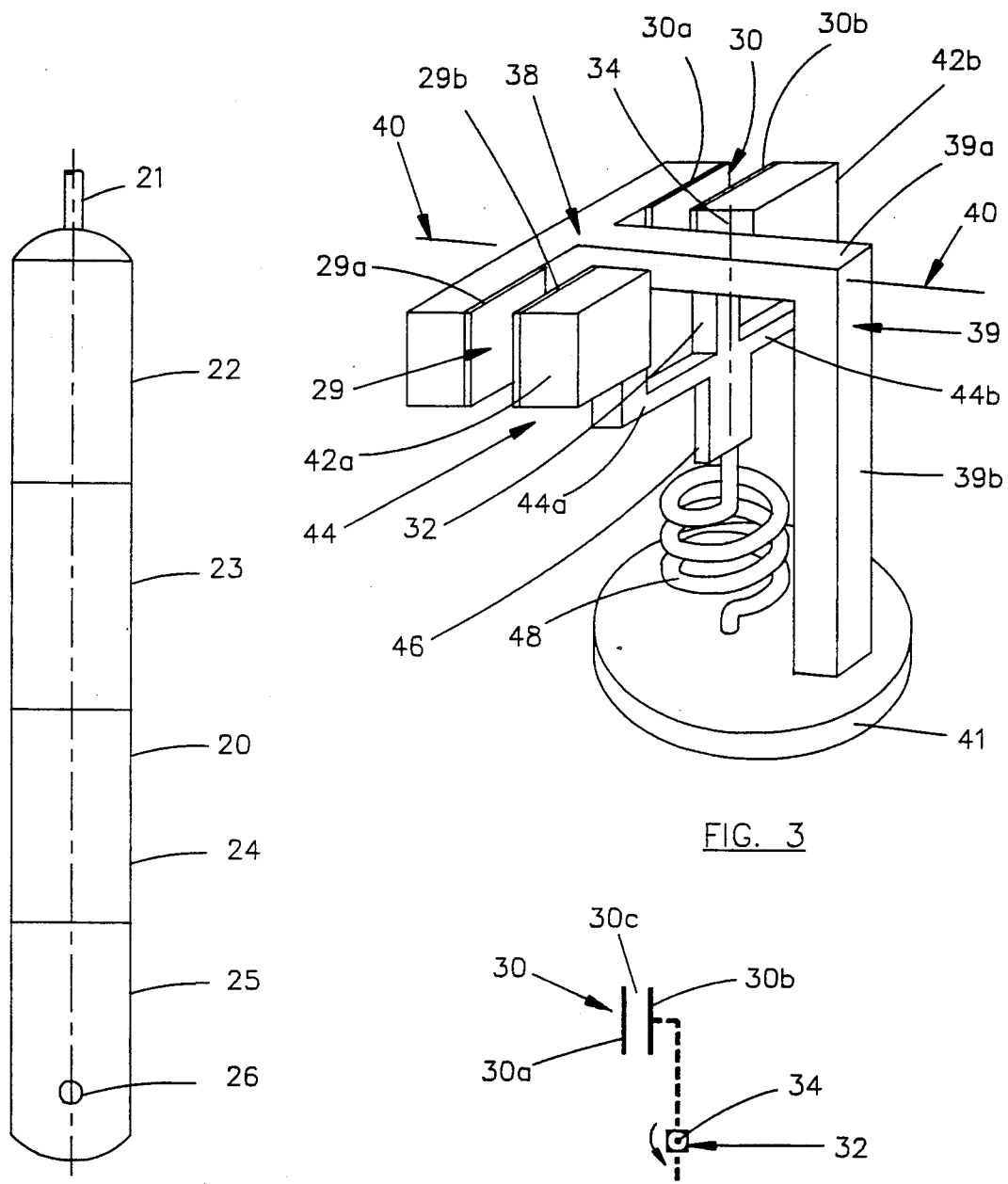
FIG. 1
FIG. 3
FIG. 2

CAPACITOR AND PRESSURE TRANSDUCER

RELATED APPLICATIONS

This application is related to Ser. No. 753,868 filed Sep. 3, 1991 and entitled, CAPACITOR AND PRESSURE TRANSDUCER, and to Ser. No. 730,694 filed Jul. 16, 1991 and entitled "CAPACITOR AND PRESSURE TRANSDUCER".

FIELD OF THE INVENTION

This invention relates to capacitors and pressure transducers and more particularly to relatively small capacitors utilizing microdisplacements for use in high pressure transducers requiring a wide pressure range of operations under changing temperature conditions and for producing pressure measurements with a high degree of accuracy.

BACKGROUND OF THE INVENTION

While the present invention finds particular usefulness in the oil industry, it has particular application in other hostile pressure and temperature environments where size of the transducer and accuracy of the measurements are important. In an oil well pressure transducer, it is common to size a unit to go into a small diameter metal pressure housing for measurement of pressures up to 20,000 psi and even more and which can be subjected to downhole temperatures up to 400° F. or more. The pressure housing must have a wall thickness sufficient to withstand the downhole pressures so that the O.D. of the internal pressure transducer is in the neighborhood of one inch.

A downhole oil well pressure gauge can be transported by a wireline, cable or pipe string to one or more levels of interest in a well bore where both temperature and pressure are sensed over a period of time. Typically, pressure measurements are repeatedly sampled and recorded over a period of time at a sampling rate determined by down hole electronics and may be stored in a downhole memory for subsequent replay or sent to the surface for analysis. Alternately, sometimes gauges are attached to production strings or other downhole equipment for extended periods of time or "permanently". In both uses of the gauge, sudden downhole pressure changes can also typically accompanied by a temperature change in a relatively short period of time. It is also important for the accuracy of the pressure sensor to not change its calibration over a period of time in the borehole in response to pressure or temperature effects in the boreholes. Thus, there is a need for a pressure gauge for high pressure measurements which is also insensitive to sudden changes in temperature or effects of pressure. The present invention relates to high pressure transducers which can accurately measure high pressure changes under transient temperature conditions independently of the temperature.

Under the combined effect of high temperature and pressure conditions, the typical pressure sensor structure is subjected to high stress by the applied high pressure and subjected to high temperature both of which cause creep in the materials of the sensor structure. Creep in materials tends to be exponentially related to both temperature and stress levels. The effect of creep or permanent deformation in materials is to alter the calibration or measurement characteristics of a sensor and cause the sensor to obtain inaccurate measurements from its calibration standard over a period of time.

Heretofore, capacitance type transducers have been utilized for pressure measurements where a downhole oil well pressure varies an electrical capacitance as a function of pressure. The pressure is translated to a capacitance measurement by a pressure diaphragm moving parallel arranged capacitance plates toward and away from one another. An example of this kind of device is shown in U.S. Pat. No. 4,322,775.

I have also coupled a bourdon tube to a capacitance type of sensor as disclosed in U.S. Pat. No. 4,873,870 in which sensor system, the pressure in the bourdon tube generates a directional linear force to displace quartz supported parallel arranged capacitor elements toward and away from one another. While this device is satisfactory for a number of applications, it is a difficult unit to manufacture.

In the present invention, I have developed a capacitor device which has a unique relationship of capacitors that can be constructed from metals to respond to low force inputs and be relatively insensitive to temperature changes. The capacitor device is particularly adaptable to measurement of high pressure with a high degree of accuracy and repeatability over a period of time.

SUMMARY OF THE INVENTION

In the present invention, dual capacitors are defined by spaced apart capacitor plates respectively located on capacitor base members. The capacitor base members are vertically arranged in a pressure housing. The capacitor plates for each capacitor are disposed at equally offset locations relative to a central vertical axis for the device so that a capacitor is located on either side of the vertical axis. One of the capacitor base members can be angularly displaced about a vertical displacement axis by an applied torque force to dependently vary the respective capacitance of the capacitors. The angular displacement is obtained by a spirally wound bourdon tube which, when subjected to internal fluid pressure, produces a torque about the displacement axis. The displacement axis is centrally located in the angularly displaceable capacitor base member.

The bourdon tube is attached to the displaceable capacitor base member and to a reference base member and provides a torque force to capacitance torque beams in the angularly displaceable capacitor base member. Although the bourdon tube can be subjected to high pressures, the stress levels in the metal bourdon tube can be designed to be well within its elastic limits because only a low force is required to obtain a micro displacement of the torsion beams and the capacitor base member in micro measurements. Micro displacements of the capacitors are easily measured. Thus, creep and permanent distortion in the materials, which are caused by stress, are minimized in the system. Further, the effect of bourdon tube creep is reduced by the constraining effect of the torque beams as will be described more fully hereafter.

By arranging the capacitor base members so that related capacitances between capacitor plates are varied as a function of an angular relationship of the capacitor plates relative to a mid-plane, a high capacitance sensitivity can be obtained with low angular deflection. That is, a micro dimensional change in the capacitor gap produces a defined measurement parameter. The high sensitivity is obtained by measurement of a small displacement of the capacitor plates at a significant distance from the center of angular displacement (the displacement axis). The elastic characteristics of a metal torque beam means coupled to the force end of the spirally wound bourdon tube by a torque coupling become the primary determining element relative to elastic properties.

The reason that the torsion beam means is a primary determining element is that the deflection of the bourdon tube is restrained by the torsion beam means to be a small fraction of the unrestrained deflection of the bourdon tube. Thus, the deflection of the bourdon tube is controlled by the elastic characteristics of the torsion beam means and the bourdon tube becomes essentially a pressure to force converter. By using a low driving torque force of a bourdon tube (even for high pressure) and a minute angular deflection of the torsion beam means, the stress levels in the bourdon tube and particularly in the torque beam means can be kept well within micro-elastic limits. High performance metal alloys can then be used to provide correspondingly higher micro yield values so that near perfect elastic characteristics are attainable in the operating range of the transducer.

Temperature is an important factor because it can affect the calibration of the sensor. While a pressure measuring device at an ambient temperature can be generally corrected by measured temperature, a change of temperature from an ambient value can thermally affect the response of the pressure measuring device to pressure which affects the accuracy of the pressure measurement. Changes in temperature often occur with changes in pressure so it is important to accurate pressure measurement for the pressure measuring device to be insensitive to changing or varying temperatures or to compensate for the changing temperatures.

In the present invention, aligned metal torque beams support a first capacitor base member in a vertical position. The base member has an attached torque coupling where the torque coupling extends vertically between a first capacitor base member and a bourdon tube. The first capacitor base member is arranged parallel to a fixed second capacitor base member. The torque beams have a rectangular cross section and are aligned with a vertical displacement axis which aligns the axis of the torque coupling. The non symmetrical cross section of the torque beams allows for large rigidity in the direction of the long cross sectional dimension without greatly increasing the torsional rigidity. The spirally wound bourdon tube is arranged with its coil axis aligned with the vertical displacement axis. With the vertical support alignment, temperature does not significantly affect the capacitor relationship.

DESCRIPTION OF THE DRAWINGS

FIG. 1 is a typical arrangement for an oil well pressure measuring device as found in current use;

FIG. 2 is a schematic illustration of the concept embodied in the present invention;

FIG. 3 is a schematic view in perspective of a structural relationship for the invention;

DESCRIPTION OF THE PRESENT INVENTION

Figure 4:
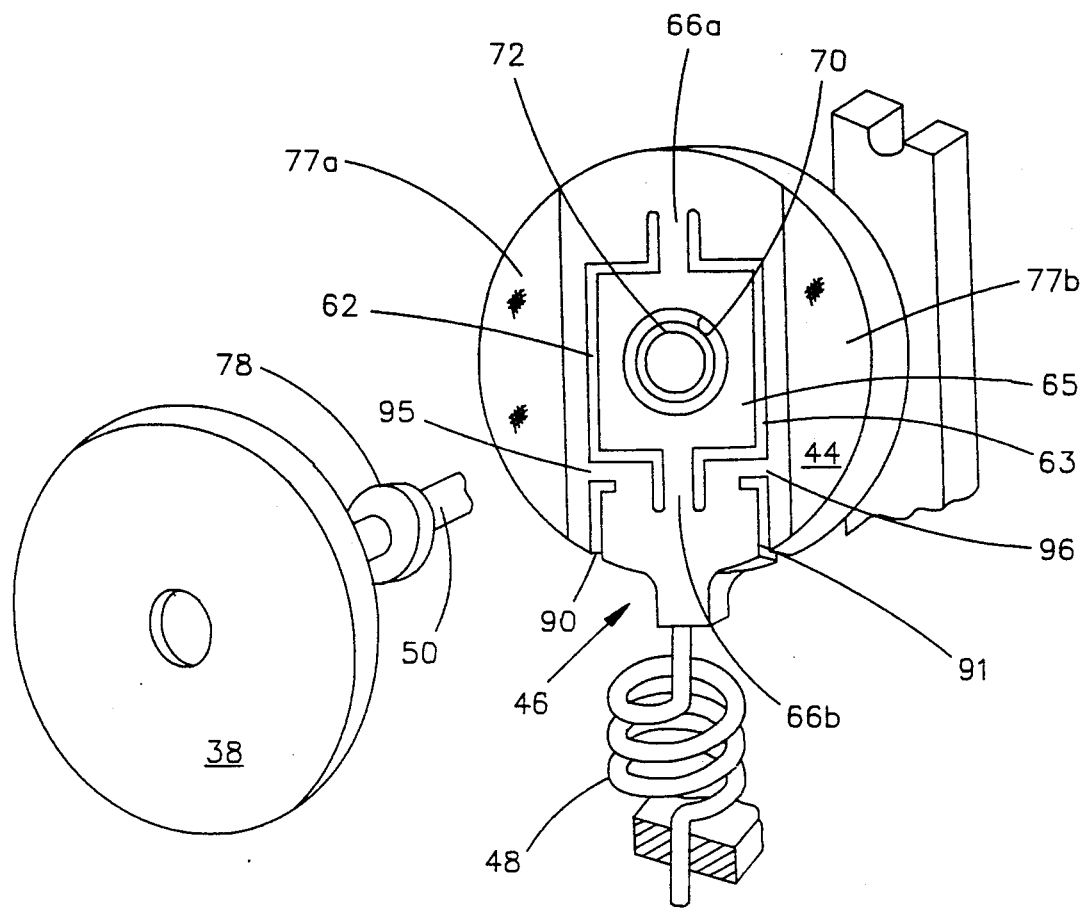
FIG. 4 is a schematic view in perspective of structure embodied in the present invention.

By way of background, as shown in FIG. 1, a downhole cylindrically shaped well tool 20 is sized for insertion through a small diameter well tubing and adapted for coupling to the end of a wireline cable 21. The cable 21 extends to a surface located spooling reel or drum (not shown). The tool 20 generally includes a DC battery pack section 22, as a source of electrical power, an electronic section 23 with electrical circuitry for electrically processing and for providing electrical power, a temperature sensor section 24 with a temperature probe for sensing temperature and a pressure sensor section 25 with a pressure transducer for sensing pressure. An opening 26 admits fluid under pressure to the pressure sensor or the transducer in the sensor section 25. For further reference purposes, see U.S. Pat. No. 4,763,259.

In permanent gauge installations the temperature and sensor sections are incorporated with downhole equipment for permanent position or location in a well bore. Referring now to FIG. 2 and FIG. 3, the operating concept of the apparatus of the present invention is schematically (but disproportionally) illustrated for descriptive purposes. In FIG. 2, separate electrical capacitors 29,30 are illustrated where the capacitor 29 has parallel capacitor plates 29a,29b which are separated by a capacitance gap 29C. The capacitor 30 has parallel capacitor plates 30a,30b which are separated by a capacitance gap 30C. The plates 29a,30a are fixed and in a common plane transverse to the plane of the drawing and the plates 29b,30b are in a parallel common plane. The plates 29b,30b are attached (see dashed line) to a torsion beam means 32. The beam means 32 has a torque axis 34 in a transverse plane and can be torqued about its axis 34 to deflect common plane for the plates 29b and 30b and dependently alter the capacitance of the capacitors 29,30.

As shown schematically in more detail in FIG. 3, the capacitor plates 29a,30a are on a fixed base member 38 and are located equidistant from a central horizontal axis 40. A support means 39 with a horizontal extension 39a and a vertical extension 39b is fixed to a lower base member 41.

The capacitor plates 29b and 30b are located on elements 42a,42b of a base member 44. The elements 42a,42b are connected by horizontal extensions 44a,44b to a vertical torque coupling element 46 and are connected by a vertical torsion beam element 32 to the support means 39. The torque coupling element 46 is connected to the stub or closed end of a spirally wound bourdon tube 48. The open end of the bourdon tube 48 passes through the base member 41 and is attached thereto. The axis 34 of the torsion beam element 32 and the coil axis of the bourdon tube 48 are aligned on a common vertical axis and intersect the horizontal axis 40. The axes 34 and 40 defined a vertical plane.

It can be appreciated that the structure is arranged so that an applied pressure in the bourdon tube causes the bourdon tube to develop a torque force which is applied to the beam element 32 so that the plates 29b and 30b are angularly displaced about the vertical displacement axis 34 and dependently change the capacitor gaps 29c,30c. Thus, separate capacitors respectively utilizing the capacitance plates 29a,29b and 30a,30b will have dependently related capacitance changes in response to rotative displacement. As will be discussed herein, the displacement is in microdimensions which reduces the stress in the torsion beam element.

From the foregoing basic illustration of a concept of the present invention, it can be appreciated that a bourdon tube is utilized to develop a low torque force in response to high pressure which acts on a torsion beam member about a vertical displacement axis and produces a micro dimensional deflection of dependent capacitors. By maintaining the amount of deflection within the micro-elastic characteristics of the material for the beam member and utilizing low torque forces, the stress levels in the beam member can be kept low which permits high accuracy and repeatable measurements. The high accuracy measurements are obtainable because permanent distortion of the material stress does not appreciably occur and consequently does not affect the measurements. Material criterion for the torsion beam element is that the material should have a micro yield and micro creep point which is above the stress level produced by a torque force.

Figure 5:
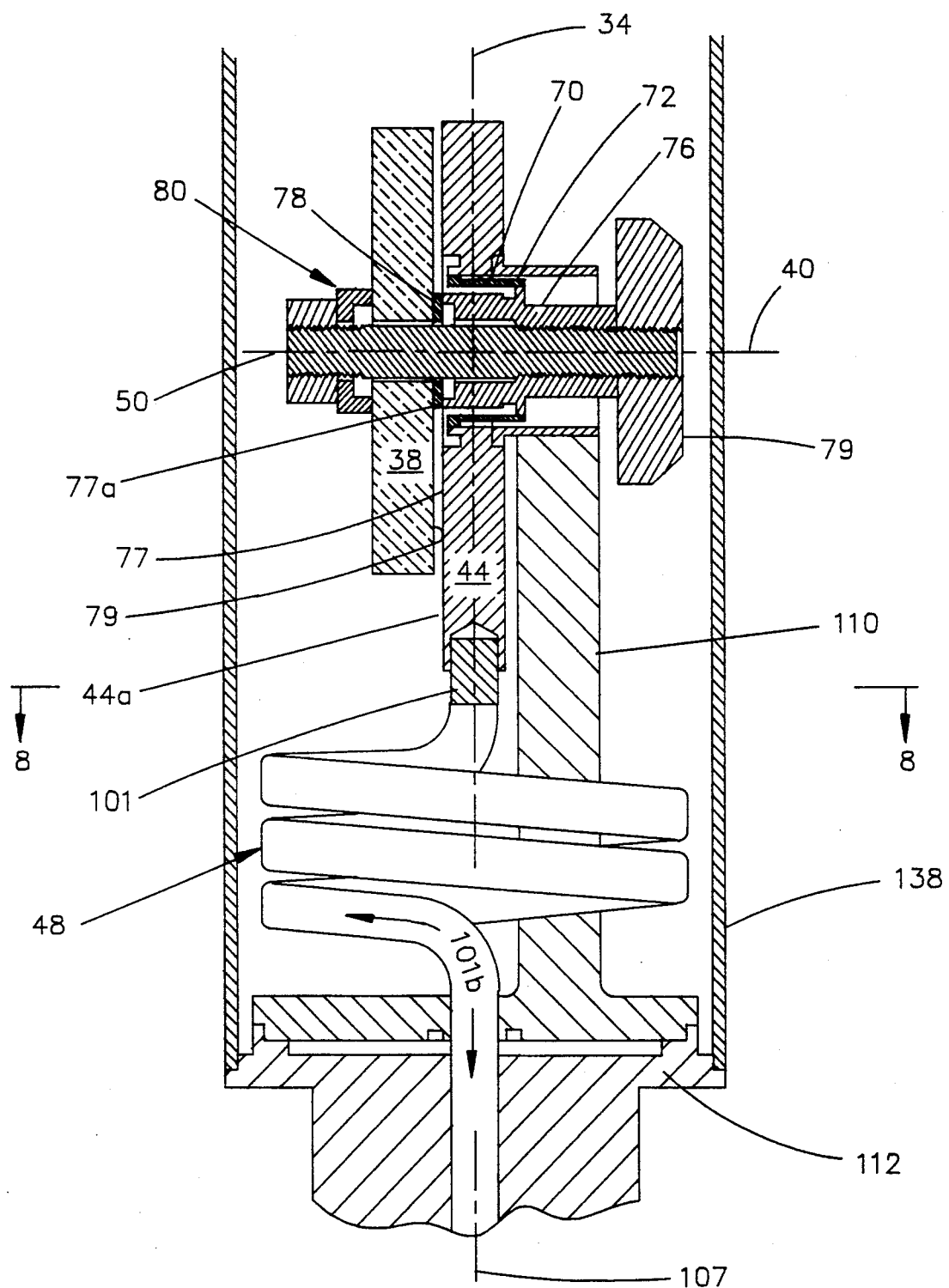
FIG. 5 is a view in longitudinal cross section through a vertical central axis of one form of the present invention.
Figure 6:
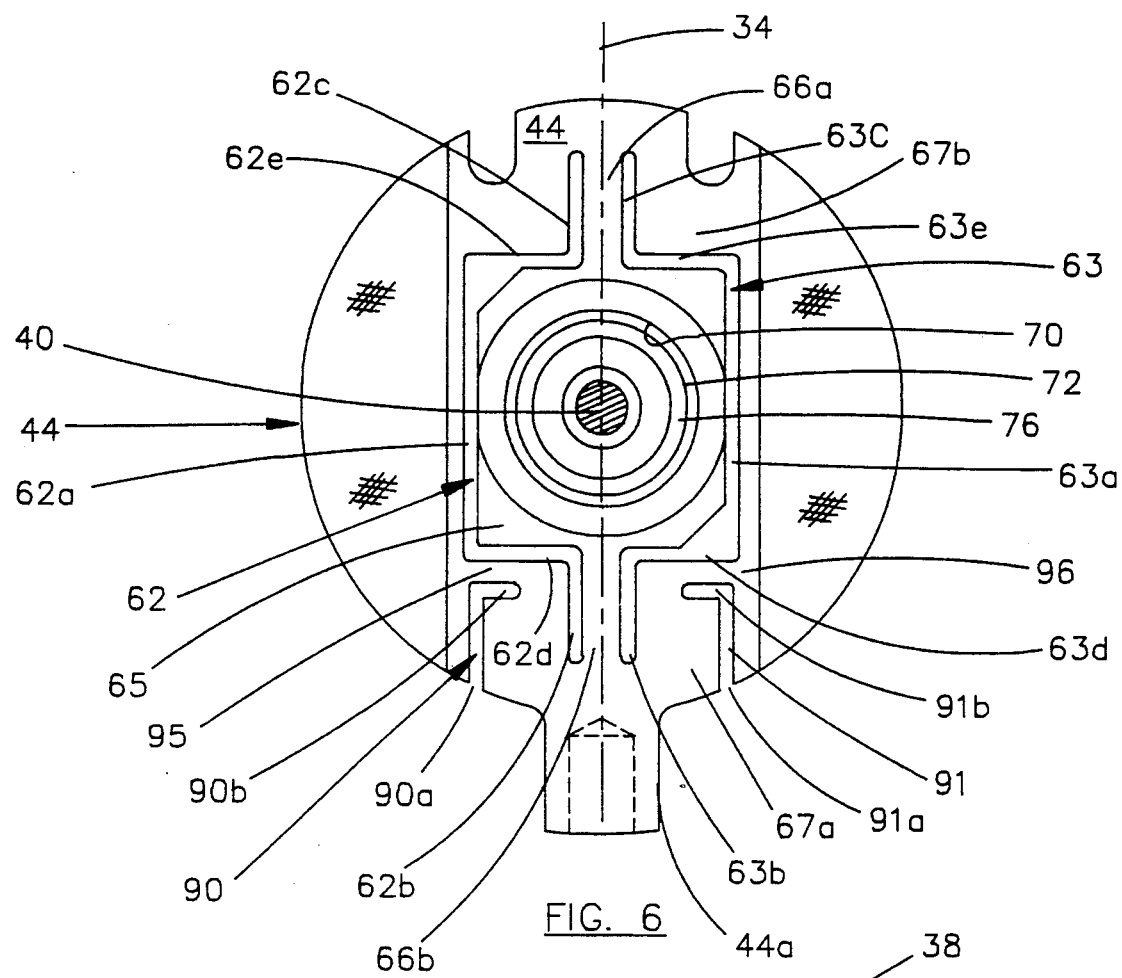
FIG. 6 is a plan view of the bottom surface of the upper capacitor base member of the invention.

Referring now to FIGS. 4, 5 and 6, a more detailed illustration is provided for the capacitor arrangement of the present invention. In the illustration in the drawings, the structure of a capacitance transducer, as illustrated, includes an elongated, cylindrically shaped central fastener rod 50 with a central longitudinal axis 40 which is shown in a horizontal position. The axis 40 is normal to the planes of the capacitor plates. The rod 50 is part of the support means and couples a first vertical capacitor plate base member 38 to a fixed center section 65 (see FIGS. 4 and 6) in a second vertical capacitor plate base member 44. The first base member 38 is cylindrically shaped and is made of a material having inherently dimensionally stable characteristics under changing environmental conditions such as temperature and time aging. Quartz is a suitable material.

As shown in FIG. 4 and FIG. 6, the second capacitor base member 44 is a cylindrically shaped metal plate member which has a first slot configuration of slot systems 62,63 which are defined by spaced apart wall surfaces and which are tortuously located in the body of the second base member 44. The first slot configuration provides the central plate section 65 which is connected by spaced apart torsion beam members or sections 66a,66b to outer plate sections 67a,67b (see FIG. 6). The beam members 66a,66b are rectangular shaped in cross section with a narrow dimension in the plane of the drawing (FIG. 6) and a long dimension in a transverse plane. The beam members 66a,66b are adapted to be torqued about a central vertical torque or displacement axis 34 where the torque or displacement axis 34 is located centrally of the beam members 66a,66b and on a vertical median plane extending through the second base member 44. The displacement axis 34 also intersects and defines a vertical plane with the axis 40. The displacement axis 34 is parallel to the parallel planes in which the capacitor plates are located.

The central section 65 thus is a generally rectangularly shaped member defined between the slots systems 62 and 63 which are symmetrically arranged with respect to a central displacement axis 34. The outer section of the second base member 44 is attached by the torsion beam members 66a,6b to the central section 65 along the central axis 34. Also along the central axis is a torque coupling element 44a (see FIG. 6).

As shown in FIG. 6, the slot system 62 has a central vertically walled portion 62a connected to parallel arranged walled end portions 62b and 62c by transversely arranged wall slot portions 62d and 62e. The slot 63 has similarly arranged portions 63a,63b,63c,63d and 63e relative to the slot system 62. The spacing between the end portions 62b,63b and 62c,63c of the slots 62 and 63 define the narrow width dimension of the beam members 66a and 66b. the length of the slot portions 62b,63b and 62c,63c also defines the length of the beam members 66a and 66b.

Referring to FIG. 5, in the center of the central section 65 and the base member 44 is a mounting bore 70 which is centered on the axis 40. The bore 70 receives an annular outer tubular support ring 72. The outer support ring 72 is welded about its periphery at its end surface to the central section 65. Disposed within the outer support ring 72 (see FIG. 5) is an annular inner tubular support member 76.

The inwardly facing planar surface 77 of the outer plate sections of the second base member 44 is on the same vertical plane as the upper surface 77a of the center section 65. The facing surface 79 of the first base member 38 is parallel to the surface 77 of the second base member 44. Between the inner support member 76 on the second base member 44 and the first base member 38 is a disc shaped spacer member 78. The spacer member 78 effectively defines the capacitance gap for capacitor plates on the surfaces 79 and 77.

The rod 50 is threadedly attached to the support member 76 and extends through a centrally located opening on the first base member. A clamping means 80 threadedly attaches to the rod 50 so that the first and second basemembers 38 and 44 are assembled in a unitary assembly. A portion of the rod 50 extends outwardly of the support member 76 and is threadedly attached and welded to a balance mass 79. The balance mass 79 overcomes gravity effects when the device is in a horizontal position. The spacer member 78, the rod 50, the clamping means 80, and the support member 76 can be made from a material which is selected to have similar temperature expansion characteristics to the selected material for the base member 38. A metal material such as Invar is suitable. The base member 44 is made from a high strength material, such as a maraging stainless steel with good elastic characteristics for the torsion beam members. The steel base member 44 also will provide an electrical ground for the capacitor electrical system. By way of illustration, the coefficient of expansion for various materials averages (at room temperature) as follows:

| Invar | 0.2 parts/million/°F. |
|---|---|
| Maraging | 6 parts/million/°F. |
| Quartz | 0.3 parts/million/°F. |

The first capacitor base member 38, as noted before, is a cylindrically shaped member preferably constructed from a quartz material and has first and second independent capacitance plate films 79a and 79b (see FIG. 7) which are sputtered in separate locations onto a surface 79 of the base member 38. The capacitance plate film 79a is arranged in spacial alignment with the planar surface 77 on the second capacitance base member 44. Connection is made to the edge of the quartz plate. Electrical wire conductors are then connectable to each capacitor film plate for separate capacitor measurements. On the surface 77, facing capacitance plate films 77a,77b (see FIG. 4) are provided, if desired, or the metal can be used as a ground surface in a grounded electrical capacitance system.

As shown in FIG. 5, the planar surface 79 on the first base member 38 is arranged normally parallel to the planar surface 77 on the second capacitor base member 44 and is normally separated therefrom by a capacitor spacing distance or gap. The capacitance plate films 79a and 79b which are offset from the central horizontal axis 40 (see FIG. 7) and from the vertical plane through the displacement axis 34 are similarly spaced parallel to the planar surface 77 on the base member 44. The widths of the capacitor gaps between the respective plate films 79a,79b and the surface 77 is basically defined by the width of the spacer member 78. It can thus be appreciated that the clamping means 80 on the fastener rod 50 attach the first capacitor base member 38 to the inner support ring 76 and, in turn, to the central section 65 of the second capacitor base member 44.

Referring again to FIGS. 4 and 6, the second capacitor base member 44 is also provided with a second vertical wall slot system comprised of angular "L" shaped slots 90 and 91 which are symmetrically arranged with respect to the axis 34. The sidewalls of the slot portion 90a of the sidewalls of slot 90 align with the sidewalls of the slot portion 62a of the slot 62. The sidewalls of the slot portion 91a of the slot 91 align in vertical planes with the sidewalls of the slot portion 63a of the slot 63. The sidewalls of the slot portions 90b and 91b of the slots 90,91 are aligned in horizontal planes with one another and are perpendicularly arranged relative to the displacement axis 34. It can be seen that the slot portions 90b and the slot portions 91b, respectively, define transverse beam portions 95,96 about an axis perpendicular to the displacement axis 34. The purpose of this arrangement is to minimize temperature effects by providing an equal and accurately controlled condition path to each capacitance side.

The torquing of the beam members 66a,66b on the central section 65 of the base member 44 is accomplished by a spirally wound bourdon tube 48 (FIGS. 4 and 5). The bourdon tube 48 has a closed stub end 101 (FIG. 5) which is aligned with the displacement axis 34 and is attached to the torque coupling element 44a of the base member 44. The spirally wound bourdon tube 48 has a central vertical coil axis 107 which aligns with the displacement axis 34. When the bourdon tube is subjected to internal pressure it will produce a torque force about the axis 34 and the axis 107.

The assembly of the base members 38 and 44 is supported on a vertical support member 110 and the mounting beam 73 is welded to the support member 110. The support member 110 is attached to a cylindrically shaped base member 112 which couples to a pressure inlet. The open end of the bourdon tube 48 extends through an opening in the base member 112. The tube 48 is welded to the support member 110, 112 so that the bourdon tube is fixed in position between the base member 110 and the base member 44.

Figure 7:
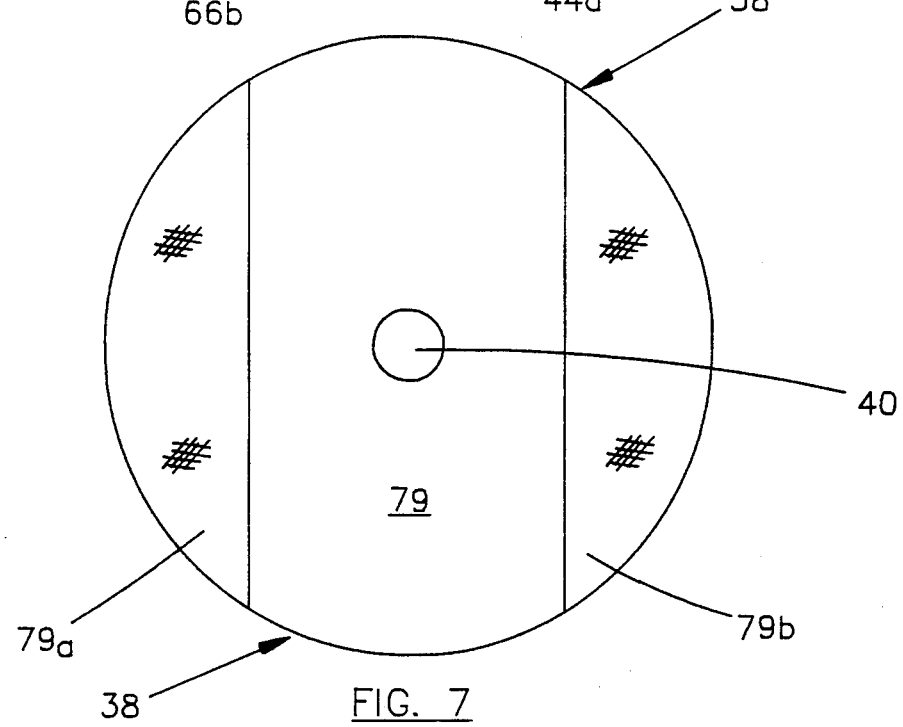
FIG. 7 is a plan view of the upper surface of the member 60 to illustrate the slot system.

As may be appreciated from FIGS. 5 and 7, the base member 38 and the support member 110 constitute a first expansion unit assembly and the base member 44, and the bourdon tube 48 constitute a second expansion unit assembly. Temperature changes produce equal displacement of the second expansion unit assembly relative to the first expansion unit assembly and compensate for changes in dimensions due to temperature. Even if not exactly equal the difference in displacement is absorbed by the coil of the bourdon tube without producing a significant torque effect. In practice, a metal cylindrical enclosure housing 138 encloses the capacitance at a vacuum or contains inert gas.

One of the features of the present invention is the arrangement which enables use of micro-elastic characteristics of metals. By way of definition, the macro yield point of a metal can be defined as the point where the metal has a set or plastic strain (permanent deformation) of 0.2% or two parts per thousand. The micro yield point of a metal is defined as the point where the metal has a set in a range of 0.01% to 0.0001% or one part per ten thousand to one part per million. In utilizing micro-elastic characteristics a low or small force produces a small deflection. As an example, a 0.3 inch pound torque is used to produce a capacitance deflection of 0.001 radians. This arrangement permits measurement of high pressure 10,000–15,000 psi or more by utilizing a bourdon tube coupled to a capacitor transducer. The capacitor transducer utilizes a relatively small deflection so that the primary determining element is the torque beams which have very low stress levels. The bourdon tube then operates in an essentially constrained mode as a pressure to force converter. Additionally since the stress levels in the torsion beam members are in the micro-elastic range, the elastic characteristics of the torsion beams can approach nearly ideal performance. Ideal performance is approached by the diminishing effect of hysteresis creep, and non-linear response as stress levels are reduced.

The stress levels in obtaining micro-elastic characteristics are low because the deflection required for the capacitor sensor can be small, for example 0.001 radians. The beam members providing the displacement axis are stiff or rigid and the torque force applied is low, for example 0.3 inch pounds.

By way of example, the diameter of the base member 38 is about 0.850 inches. The diameter of the base member 44 is about 0.900 inches and 0.125 inches thick. the width of the slots is about 0.020 inches. The spacer 78 is 0.001 inches thick.

While the preferred embodiment is to exploit micro yield characteristics to produce accuracy and repeatability, macro yield materials may be suitable for some applications.

A bourdon tube as contrasted to a circular tube has a flattened or ovular cross section as compared to a circular cross section. In high pressure applications a flat oval cross section is commonly employed. In a flattened cross section, internal pressure produces higher stress in the wall because the member tends to move toward a circular cross sectional form. When a tube member with a flattened cross section is spirally wound, internal pressure tends to uncurl the spiral. The flatness of the tube, the coil diameter and the wall thickness also have a bearing on the stress.

Figure 8:
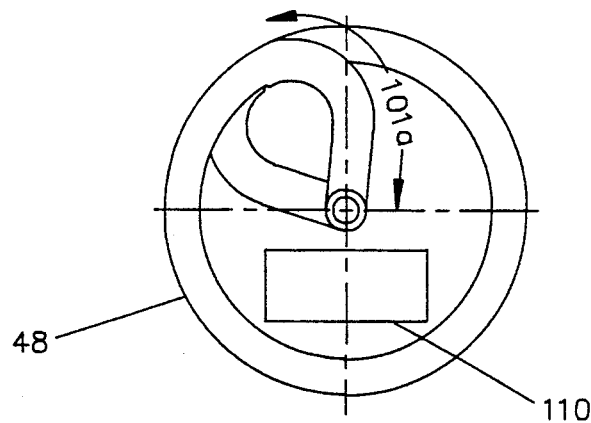
FIG. 8 is a plan view in a support mounting for illustrating the bourdon tube.

In the present invention, the spiral closed end 101 of a spirally wound flattened bourdon tube is connected to a metal base member 44 which is constructed to enable torsional deflection of a beam member as a function of the applied pressure in the bourdon tube. As shown in FIGS. 5 and 8, there are two complete turns of the bourdon tube which are flattened between circular end pieces 101a,101b. It is preferable to have an even number of turns in the bourdon tube. Bourdon tube design is well known, and the design should minimize the stress in the bourdon tube to develop a low force for the beam members. There is zero force on the capacitance plates. In short, the capacitance members are moved relative to one another by angular deflection of the capacitor base members. Because the force moment of the bourdon tube is small, the stress level in the torque beam can be kept low. The use of high performance metal alloys can then provide near perfect elastic and stability characteristics of the torsion beam.

The effect of temperature on the torque output of a bourdon tube is minimized because the differences in linear expansions produce a very small corresponding change in torque and the capacitance plate structure which significantly rejects any displacement other than torque.

Temperature can also affect the capacitance structure. The top base member of the capacitor is preferably a low expansion material which is dimensionally stable, such as quartz. The lower capacitance member is preferably made of the same material as the torque beam to avoid welds.

The two capacitance plates are respectively mounted by aligned connections to a base member which, in turn, is attached to another mass. Since the structure is mounted in a vacuum, temperature change of the capacitance plates is affected primarily by thermal conduction through the mountings.

The electronics used for this sensor is the same as described in U.S. Pat. No. 4,091,693. A ratio metric measurement is made using the relationship $(C_1-C_2)/(C_1+C_2)$ so that the oscillator factor cancels out of the reading. One of the important features of the present invention is that the capacitor can operate with minute deflection changes and produce measurable signals.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A dual capacitor device utilizing dependent capacitance for measurement purposes comprising:

a first capacitance base member and a second capacitance base member respectively having capacitor surfaces arranged parallel to one another and disposed in spaced apart, first and second parallel planes and respectively defining first and second capacitors, said first and second capacitors being located on each side of a transducer plane which is transverse to said parallel planes;

said second capacitance base member having a centrally located section, an outer section and torsion beam means connecting said centrally located section to said outer section, said outer section of said second capacitance base member having one of said capacitor surfaces for each of said first and second capacitors and said first capacitance base member having the other of said capacitor surfaces for said first and second capacitors;

attachment means connecting said centrally located section to said first capacitance base member;

said torsion beam means having a displacement axis located parallel to said capacitor surfaces, said torsion beam means being responsive to a torsion force about said displacement axis for permitting an angular torque displacement of said outer section of said second capacitance base member relative to said centrally located section about said displacement axis and for displacing said one capacitor surfaces relative to said other capacitor surfaces for producing a dependent capacitance change in said first and second capacitors in response to an angular torque displacement; and force means coupled to said outer section of said second capacitance base member for producing a torsion force on said torsion beam means about said displacement axis relative to said first capacitance base member for developing angular torque displacement of said outer section relative to said first capacitance base member and a dependent capacitance change in said first and second capacitors as a function of said torsion force.

2. The capacitor device as set forth in claim 1 wherein the torsion beam means has a rectangular cross section with long and short dimensions relative to said displacement axis, and where the outer surfaces of said torsion beam means are disposed parallel to said displacement axis and wherein said long dimension, in the absence of a torsion force, is normal to the parallel planes of said capacitor surfaces, and wherein said force means includes a spirally wound bourdon tube for receiving fluid under pressure and developing a torsion force, said bourdon tube having a coil axis which is aligned with said displacement axis.

3. The capacitor device as set forth in claim 2 wherein said second capacitor base member is an integral member with a first parallel walled slot means which define said centrally located section and said torsion beam means.

4. The capacitor device as set forth in claim 1 wherein said torsion beam means in said second capacitance base member includes a parallel walled slot means in said capacitance base member, said slot means defining first and second torsion beam elements which are disposed along said displacement axis and connect said outer base portion of said second capacitance base member to said centrally located section.

5. The capacitor device as set forth in claim 1 wherein the torsion beam means are constructed from a high strength metal material having good elastic characteristics and wherein said force means is a bourdon tube arranged in a coil about a coil axis for developing a torsion force which does not exceed the micro yield point of the torsion beam means and wherein said coil axis is aligned with said displacement axis.

6. The capacitor device as set forth in claim 1 wherein the torsion beam means are constructed from a high strength metal material having good elastic characteristics with a macro yield point above the working stress levels in said torsion beam means.

7. The capacitor device as set forth in claim 1 wherein the torsion beam means are constructed from a material having good elastic characteristics with a micro yield point above the working stress levels of the torsion beam means.

8. The capacitor device as set forth in claim 1 wherein the torsion beam means are constructed from a high strength metal material having good elastic characteristics in the stress range of the torsion beam means.

9. The capacitor device as set forth in claim 1 wherein the force means is a bourdon tube arranged about a coil axis for developing a torsion force which does not exceed the micro yield point of the torsion beam means and wherein said coil axis is aligned with said displacement axis.

10. A dual capacitor device utilizing dependent capacitances for measurement purposes comprising:
   a first capacitance base member and a second capacitance base member respectively having capacitor surfaces normally arranged in parallel planes, said second capacitance base member having spaced apart capacitor surfaces located on opposite sides relative to a longitudinal displacement axis where said spaced apart capacitance surfaces on said second capacitance base member and said capacitor surface on said first capacitance base member respectively define first and second capacitors;
   torsion beam means disposed along said displacement axis;
   means for attaching said torsion beam means to said second capacitance base member relative to said spaced apart capacitor surfaces and said first capacitance base member so that a torsion force on said torsion beam means can develop an angular torque displacement of said second capacitance base member about said displacement axis relative to said first capacitance base member and produce a dependent capacitance change in said first and second capacitors; and
   force means coupled to said torsion beam means for producing said torsion force on said torsion beam means about said displacement axis and for developing angular torque displacement of said second capacitance base member relative to said first capacitance base member and a capacitance change in said first and second capacitors as a function of said torsion force.

11. The capacitor device as set forth in claim 10 wherein the torsion beam means has a rectangular cross section with long and short dimensions relative to said displacement axis, and where the outer surfaces of said torsion beam means are disposed parallel to said displacement axis and wherein said long dimension, in the absence of a torsion force, is normal to the parallel planes of said capacitor surfaces; and wherein said force means includes a spirally wound bourdon tube having a coil axis which is aligned with said displacement axis.

12. The capacitor device as set forth in claim 11 wherein said second capacitance base member is an integral member with a first parallel walled slot means which define said centrally located section and said torsion beam means.

13. The capacitor device as set forth in claim 10 wherein said torsion beam means in second capacitance base member includes a parallel walled slot means which define first and second torsion beam members disposed along said displacement axis and which connect said outer base portion of said second capacitance base member to said centrally located section.

14. The capacitor device as set forth in claim 13 wherein the torsion beam means are constructed from a high strength metal material having good elastic characteristics and wherein said bourdon tube is constructed and arranged for developing a torsion force which does not exceed the micro yield point of the torsion beam means.

15. The capacitor device as set forth in claim 10 wherein the torsion beam means are constructed from a high strength metal material having good elastic characteristics with a macro yield point above the working stress levels in said torsion beam means.

16. The capacitor device as set forth in claim 10 wherein the torsion beam means are constructed from a material having good elastic characteristics with a micro yield point above the working stress levels of the torsion beam means.

17. The capacitor device as set forth in claim 10 wherein the torsion beam means are constructed from a high strength metal material having good elastic characteristics in the stress range of the torsion beam means.

18. The capacitor device as set forth in claim 10 wherein the force means is a bourdon tube arranged with two turns about a coil axis for developing a torsion force which does not exceed the micro yield point of the torsion beam means.

19. A method of measuring capacitance in a dual capacitor device utilizing dependent capacitors for measurement purposes and wherein the capacitor device has a first capacitance base member and a second capacitance base member respectively having capacitor surfaces arranged in parallel planes and defining first and second capacitors, said first and second capacitors being located relative to a central plane transverse to said parallel planes and said first and second capacitors have first and second capacitance gaps, said capacitor device having a torsion beam means and attaching means arranged for permitting angular torque displacement of the capacitor surfaces on said second capacitance base member relative to the capacitor surfaces on said first capacitance base member;
   the method comprising the steps of:
      obtaining a torque force by subjecting a bourdon tube wound in a coil about a coil axis to a fluid pressure where one end of the bourdon tube is fixed relative to said first capacitance base member and the other end of said bourdon tube is attached to said torsion beam means on said second capacitance base member;
      torquing the torsion beam means coupled to said second capacitance base member with the torque force about a displacement axis located in said central plane for angularly torquing said second capacitance base member about said displacement axis so that angular torque displacement of said second capacitance base member about said displacement axis produces a dependent change in said capacitance gaps of said first and second capacitors.

20. A method of measuring capacitance in a dual capacitor device as set forth in claim 19 wherein the torsion beam means in the second capacitance base member is constructed of metal and the torque force is maintained below the micro yield point of the torsion beam means.

21. A method of measuring capacitance in a dual capacitor device as set forth in claim 19 wherein the torsion beam means in the second capacitance base member is constructed of metal and the torque force is maintained below the micro yield of the torsion beam means.

22. A method of measuring capacitance in a dual capacitor device utilizing dependent capacitances for measurement purposes and wherein the capacitor device has a first capacitance base member and a second capacitance base member arranged with parallel capacitor surfaces in parallel planes where said parallel capacitor surfaces are located on opposite sides relative to a central transverse plane and said capacitor surfaces define first and second capacitors having first and second capacitance gaps and wherein the second capacitance base member has a central section attached to said first capacitance base member and an outer section connected by a metal torsion beam means to said central section so that said second capacitance base member can be angularly torqued relative to said first capacitance base member, and wherein said torsion beam means is disposed along a displacement axis in said central plane with the torsion beam means being coupled to a bourdon tube wound in a coil about a coil axis, and wherein said capacitor surfaces on said second capacitance base member are located on said outer section, comprising the steps of:

torquing said outer section of said second capacitance base member relative to said first capacitance base member about said displacement axis by applying a fluid pressure to said bourdon tube and developing a torque force about said displacement axis and developing an angular torque displacement of said outer section of second base member about said displacement axis relative to said first capacitance base member and in response to pressure thereby producing a dependent change in said capacitance gaps of said first and second capacitors; and maintaining the torque force below the yield point of the torsion beam means to minimize permanent distortion in said torsion beam means.

23. A method of measuring capacitance in a dual capacitor device as set forth in claim 22 wherein the torque force is maintained below the macro yield point of the torsion beam means.

24. A method of measuring capacitance in a dual capacitor device as set forth in claim 23 wherein the torque force is maintained below the micro yield point of the torsion beam means.

* * * * *